(12) United States Patent  (10) Patent No.: US 7,391,479 B2
Johnson  (45) Date of Patent: *Jun. 24, 2008

(54) METHOD AND SYSTEM FOR 3D BIDIRECTIONAL COMB FILTERING

(75) Inventor: Shawn Val Johnson, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 10/943,593

(22) Filed: Sep. 17, 2004

(65) Prior Publication Data

US 2005/0168648 A1  Aug. 4, 2005

Related U.S. Application Data

(60) Provisional application No. 60/540,577, filed on Jan. 30, 2004.

(51) Int. Cl.
*H04N 9/78* (2006.01)
(52) U.S. Cl. .................................... 348/667; 348/665
(58) Field of Classification Search ......... 348/663–670; H04N 9/78
See application file for complete search history.

(56) References Cited

U.S. PATENT DOCUMENTS 4,974,065 A * 11/1990 Murakami et al. .......... 348/668
5,523,850 A * 6/1996 Kanda et al. ................. 386/25
6,300,985 B1 * 10/2001 Lowe et al. ................. 348/665

* cited by examiner

*Primary Examiner*—M. Lee
(74) *Attorney, Agent, or Firm*—McAndrews, Held & Malloy, Ltd.

(57) ABSTRACT

Methods and systems for 3D bidirectional comb filtering of a video signal are provided. Aspects of the method may include generating a plurality of interpolated pixels for a current line, a next line and a previous line in a current frame. A plurality of interpolated pixels may be generated in a previous frame, which corresponds to the interpolated pixels in the current frame. A plurality of interpolated pixels may be generated in a next frame, which corresponds to the interpolated pixels in the current frame. At least one direction of least bandwidth may be determined among at least a portion of all the generated interpolated pixels and true pixels in the current frame. Combing may be blended according to the determined at least one direction of least bandwidth.

36 Claims, 16 Drawing Sheets

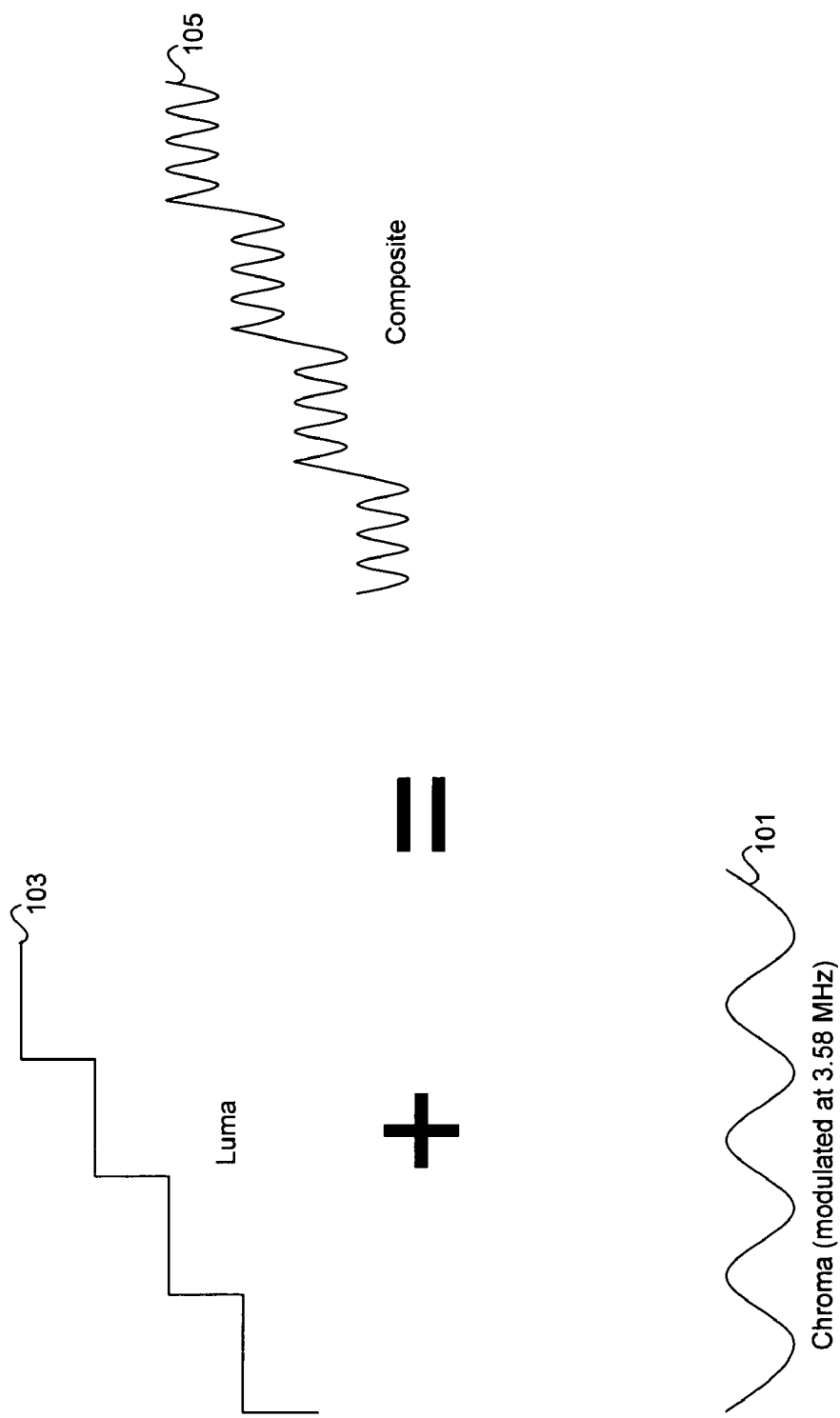

METHOD AND SYSTEM FOR 3D BIDIRECTIONAL COMB FILTERING

CROSS-REFERENCE TO RELATED APPLICATIONS/INCORPORATION BY REFERENCE

This patent application makes reference to, claims priority to and claims benefit from U.S. Provisional Patent Application Ser. No. 60/540,577, entitled "METHOD AND SYSTEM FOR 3D BIDIRECTIONAL COMB FILTER," filed on Jan. 30, 2004, the complete subject matter of which is hereby incorporated herein by reference, in its entirety.

This application makes reference to:
U.S. application Ser. No. 10/943,267 filed Sep. 17, 2004;
U.S. application Ser. No. 10/943,587 filed Sep. 17, 2004;
U.S. application Ser. No. 10/943,596 filed Sep. 17, 2004;
U.S. application Ser. No. 10/869,395 filed Jun. 16, 2004; and
U.S. application Ser. No. 10/943,641 filed Sep. 17, 2004.

The above stated applications are hereby incorporated herein by reference in their entirety.

FIELD OF THE INVENTION

Certain embodiments of the invention relate to processing of video signals. More specifically, certain embodiments of the invention relate to a method and system for 3D bidirectional comb filtering of a video signal.

BACKGROUND OF THE INVENTION

A composite video signal is the sum of a luminance (brightness) signal and a chrominance (color) signal. These signals may be referred to as luma and chroma signals, respectively. The frequency ranges of the luma and chroma signals are designed to overlap. In video processing, the luma and chroma signal components are added together in order to generate a composite video signal. The luma and chroma video elements are integrated and broadcasted as a single composite video stream. Once the broadcasted composite signal is received, the luma and chroma signal components must be separated in order for the video signal to be processed and displayed. A comb filter may be utilized for separating the chroma and luma video signal components. For example, a television may be adapted to receive a composite video input and utilize an integrated comb filter to separate the chroma and luma video signal components. However, before the television can display the received video signal, the chroma and luma video components have to be separated.

FIG. 1 is a diagram illustrating generation of a conventional composite video signal. Referring to FIG. 1, a conventional composite video signal 105 may be generated from a luma component 103 and a chroma component 101. The composite video signal 105 may be generated by adding the chroma video signal component 101 and the luma video signal component 103. The chroma signal component 101 may be modulated at 3.58 MHz and it may or may not comprise a constant chroma across the entire line. The luma signal component 103 may increase in amplitude in a stair step fashion or it may not.

FIG. 2A is a diagram illustrating modulated chroma signals in contiguous composite video frames. The chroma component may be modulated so that a frequency of each successive line of video may be phase-shifted by 180 degrees with respect to the previous line. Referring now to FIG. 2A, the previous frame 201 may comprise a previous line 203, a current line 205, and a next line 207. Similarly, the current frame 209 may comprise a previous line 211, a current line 213, and a next line 215. The current line 213 in the current frame 209 may be phase-shifted by 180 degrees from the previous line 211 in the current frame 209, as well as from the next line 215 in the current frame 209. Similarly, the current line 205 in the previous frame 201 may be phase-shifted by 180 degrees from the previous line 203 in the previous frame 201, as well as from the next line 207 in the previous frame 201. In addition, since frames in the contiguous composite video signal are at a frequency rate of 59.94 Hz, there may be a 180-degree phase shift between two adjacent frames, for example, the current frame 209 and the previous frame 201. Correspondingly, the current line 213 in the current frame may be 180 degrees phase-shifted from the current line 205 in the previous frame 201.

In conventional video processing, there are three ways to separate the luma and chroma video components and these include combing horizontally, combing vertically, and combing temporally. During separation of the luma and chroma components, there are three bandwidth directions that may incur losses in the separation process and in the separated signal. Depending on the combing method that is utilized, the separated signal may have reduced vertical bandwidth, horizontal bandwidth, and/or temporal bandwidth.

The first way to separate the luma and chroma video components is by horizontal combing. Horizontal combing may be accomplished by utilizing a notch filter, for example. Since the chroma signal component in a composite video signal may be modulated at 3.58 MHz, a notch filter set at 3.58 MHz may be utilized. Combing vertically may also be utilized to separate the luma and chroma video components. Combing vertically may be achieved in three different ways—the current line may be combed with the previous and the next line, the current line may be combed with the line just before it, or the current line may be combed with the line just after it. The vertical combing is performed spatially, which involves combing only within one field at a time and without any temporal combing.

During combing in the current frame 209, for example, if the current line 213 is added to the previous line 211, the chroma content may cancel out and two times the luma content may be obtained. On the other hand, if the previous line 211 is subtracted from the current line 213, the luma content may cancel out and two times the chroma content may be obtained. In this way, luma and chroma content may be separated from the composite video signal for further processing. However, vertical combing may result in a reduced vertical bandwidth.

A third way to comb a composite signal is to comb temporally. Combing temporally comprises combing between two frames, for example, the current frame 209 and the previous frame 201. Further, temporal combing may be characterized by a reduced temporal bandwidth. Luma and chroma content may be separated by utilizing the same addition and subtraction method between a current line and a previous line as it was utilized with vertical combing.

FIG. 2B is a diagram illustrating combing of a correlated current line 224 and a previous line 222 in a current frame 220. In this case, there is no vertical bandwidth and the previous line 222 and the current line 224 are perfectly correlated. The current line 224 may be added with the previous line 222 and two times luma may be obtained. Similarly, the previous line 222 may be subtracted from the current line 224 so that two times chroma may be obtained.

FIG. 2C is a diagram illustrating combing of a non-correlated current line 234 and a previous line 232 in a current frame 230. In this case, there may be significant vertical bandwidth. The vertical bandwidth may be high enough so that there may be no correlation between the current line 234 and the previous line 232. When the current line 234 and the previous line 232 are combed together, there may be significant error in both the luma and chroma. This may produce combing artifacts in the obtained combed video signal. A substantially the same result may be obtained when combing temporally when there is temporal bandwidth, which indicates motion. Higher bandwidth in a given direction may cause combing in that direction to result in more incorrectly separated luma and chroma.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for bidirectional comb filtering of a video signal. More specifically, certain aspects of the invention may be found in a method for separating luma and chroma components in a composite video signal. The method may comprise generating a plurality of interpolated pixels for a current line, a next line and a previous line in a current frame. A plurality of interpolated pixels may be generated in a previous frame, which corresponds to the interpolated pixels in the current frame. A plurality of interpolated pixels may be generated in a next frame, which corresponds to the interpolated pixels in the current frame. At least one direction of least bandwidth may be determined among at least a portion of all the generated interpolated pixels and true pixels in the current frame. Combing may be blended according to the determined at least one direction of least bandwidth. The interpolated pixels for the current frame may be one half cycle phase-shifted from the interpolated pixels in the previous frame and/or in the next frame.

The interpolated pixels for the previous frame may be in-phase with the interpolated pixels in the next frame. The plurality of interpolated pixels for the current line may be generated, so that each of the plurality of interpolated pixels in the current line is one quarter cycle phase-shifted from a corresponding adjacent pixel in the current line. If the determined direction of least bandwidth is among in-phase interpolated pixels in the current line, the composite video signal may be combed horizontally. If the determined direction of least bandwidth is among corresponding in-phase interpolated pixels in the current line and at least one of the previous line and the next line, the composite video signal may be combed vertically. If the determined direction of least bandwidth is among corresponding one-half cycle phase-shifted true pixels in the current line and at least one of the previous line and the next line for a luma-only video signal, the composite video signal may be combed vertically.

If the determined direction of least bandwidth is among corresponding in-phase interpolated pixels in the previous frame and in the next frame, the composite video signal may be combed temporally. If the determined direction of least bandwidth is among corresponding in-phase true pixels in the previous frame and in the next frame, the composite video signal may be combed temporally. The composite video signal may be combed in a horizontal direction and a vertical direction for the current video frame. The combing in the horizontal direction and the vertical direction may be blended with combing in a temporal direction for the current video frame.

Another aspect of the invention may provide a machine-readable storage, having stored thereon, a computer program having at least one code section executable by a machine, thereby causing the machine to perform the steps as described above for separating luma and chroma components in a composite video signal.

The system for separating luma and chroma components in a composite video signal may include at least one processor that generates a plurality of interpolated pixels for a current line, a next line and a previous line in a current frame. The processor may generate a plurality of interpolated pixels in a previous frame, which corresponds to the interpolated pixels in the current frame. The processor may generate a plurality of interpolated pixels in a next frame, which corresponds to the interpolated pixels in the current frame. The processor may determine at least one direction of least bandwidth among at least a portion of all the generated interpolated pixels and true pixels in the current frame, and may blend combing according to the determined at least one direction of least bandwidth.

The interpolated pixels for the current frame may be one half cycle phase-shifted from the interpolated pixels in the previous frame and or in the next frame. The interpolated pixels for the previous frame may be in-phase with the interpolated pixels in the next frame. The processor may generate the plurality of interpolated pixels for the current line, so that each of the plurality of interpolated pixels in the current line is one quarter cycle phase-shifted from a corresponding adjacent pixel in the current line. The processor may comb horizontally, if the determined direction of least bandwidth is among in-phase interpolated pixels in the current line. The processor may comb vertically, if the determined direction of least bandwidth is among corresponding in-phase interpolated pixels in the current line and at least one of the previous line and the next line.

The processor may comb vertically, if the determined direction of least bandwidth is among corresponding one-half cycle phase-shifted true pixels in the current line and at least one of the previous line and the next line for a luma-only video signal. If the determined direction of least bandwidth is among corresponding in-phase interpolated pixels in the previous frame and in the next frame, the processor may comb temporally. If the determined direction of least bandwidth is among corresponding in-phase true pixels in the previous frame and in the next frame, the processor may comb temporally. The processor may comb in a horizontal direction and a vertical direction for the current video frame, and may blend the combing in the horizontal direction and the vertical direction and combing in a temporal direction for the current video frame.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1 is a diagram illustrating generation of a conventional composite video signal.

DETAILED DESCRIPTION OF THE INVENTION

Certain aspects of the invention may be found in a method and system for separating luma and chroma components in a composite video signal. A plurality of interpolated pixels may be generated for a current line, a next line and a previous line in a current frame, as well as for a previous frame and a next frame. Interpolated pixels for the current frame may be one half cycle phase-shifted from the interpolated pixels in the previous frame and/or in the next frame, and interpolated pixels for the previous frame may be in-phase with interpolated pixels in the next frame. A horizontal, vertical and/or temporal direction of least bandwidth may be determined among a portion of all generated interpolated pixels and true pixels in the current frame, and combing may be blended according to the determined horizontal, vertical and/or temporal direction of least bandwidth.

If there is least bandwidth among in-phase interpolated pixels in the current line, the composite video signal may be combed horizontally. If there is least bandwidth among corresponding in-phase interpolated pixels in the current line and the previous line, or the current line and the next line, the composite video signal may be combed vertically. If there is least bandwidth among corresponding one-half cycle phase-shifted true pixels in the current line and the previous, or the current line and the next line, for a luma-only video signal, the composite video signal may be combed vertically. If there is least bandwidth among corresponding in-phase interpolated pixels, or corresponding in-phase true pixels, in the previous frame and in the next frame, the composite video signal may be combed temporally. Combing of a composite video signal in the horizontal direction and the vertical direction may be blended with combing in a temporal direction.

Figure 2A:
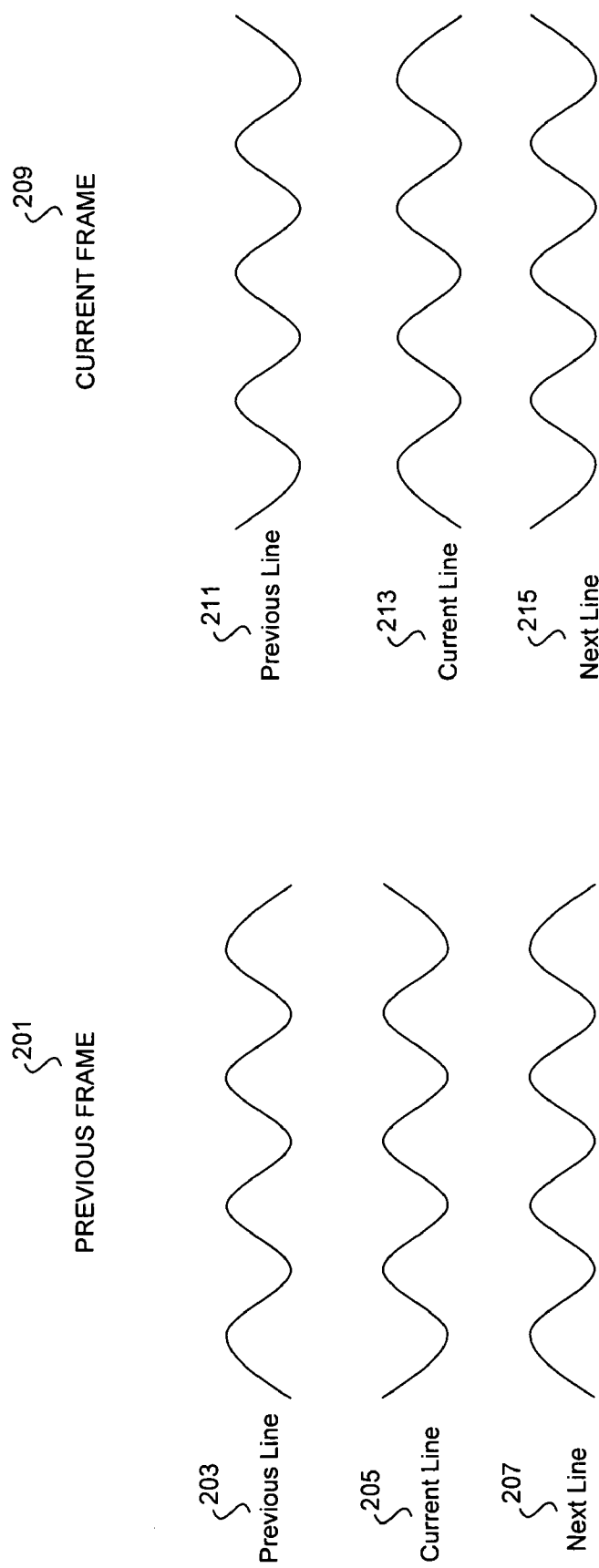
FIG. 2A is a diagram illustrating modulated chroma signals in contiguous composite video frames.
Figure 2B:
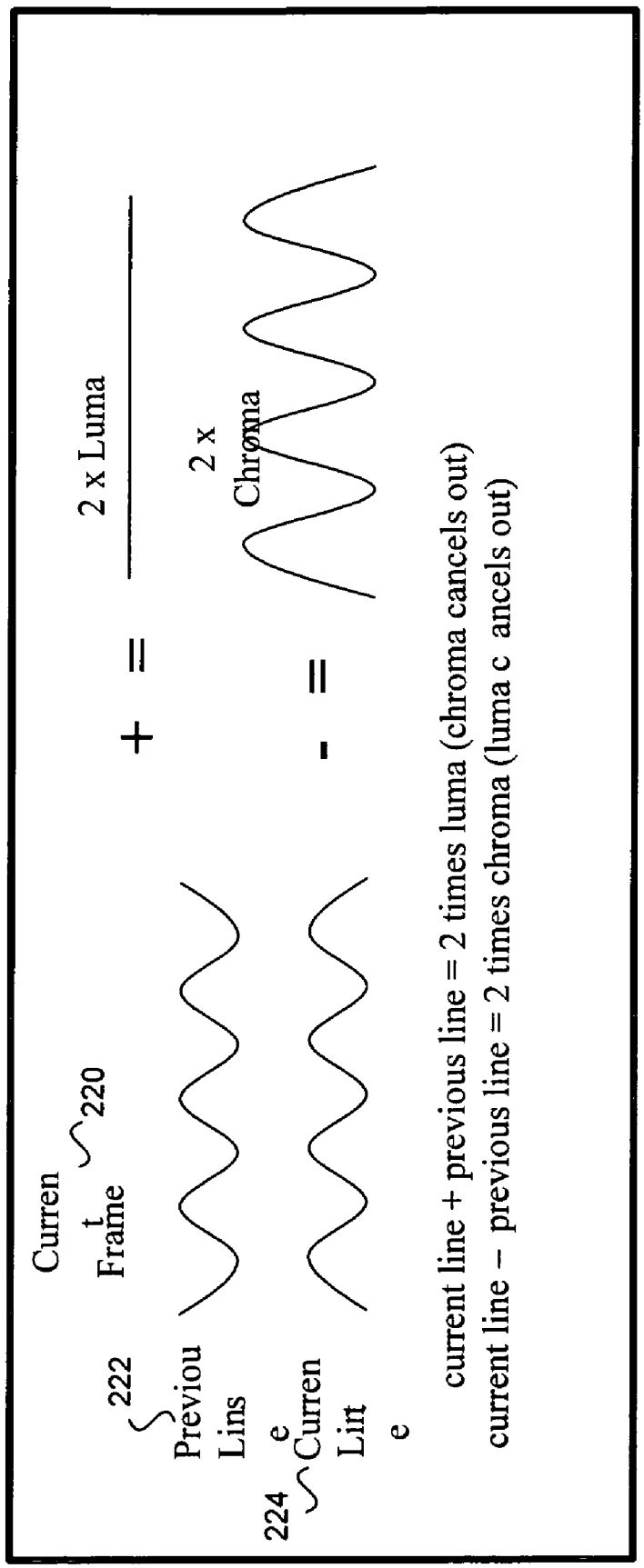
FIG. 2B is a diagram illustrating combing of a correlated current line and a previous line in a current frame.
Figure 2C:
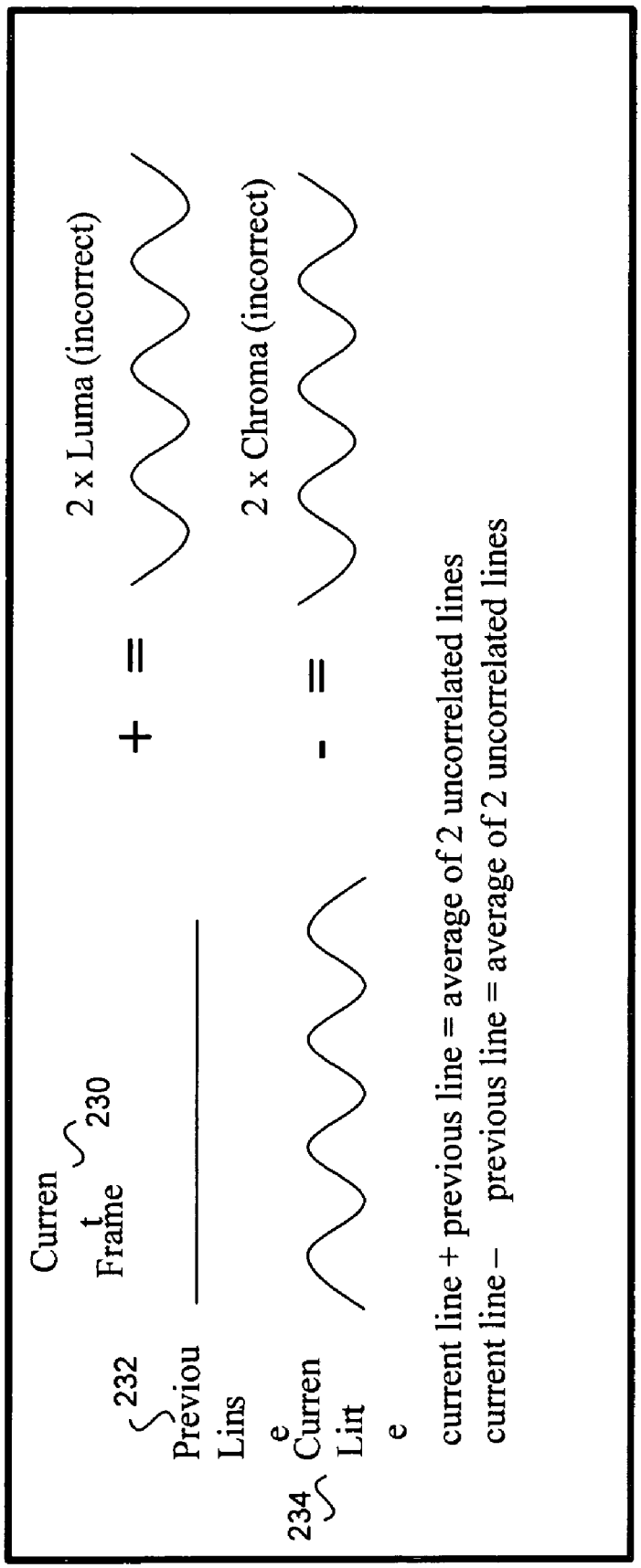
FIG. 2C is a diagram illustrating combing of a non-correlated current line and a previous line in a current frame.
Figure 3A:
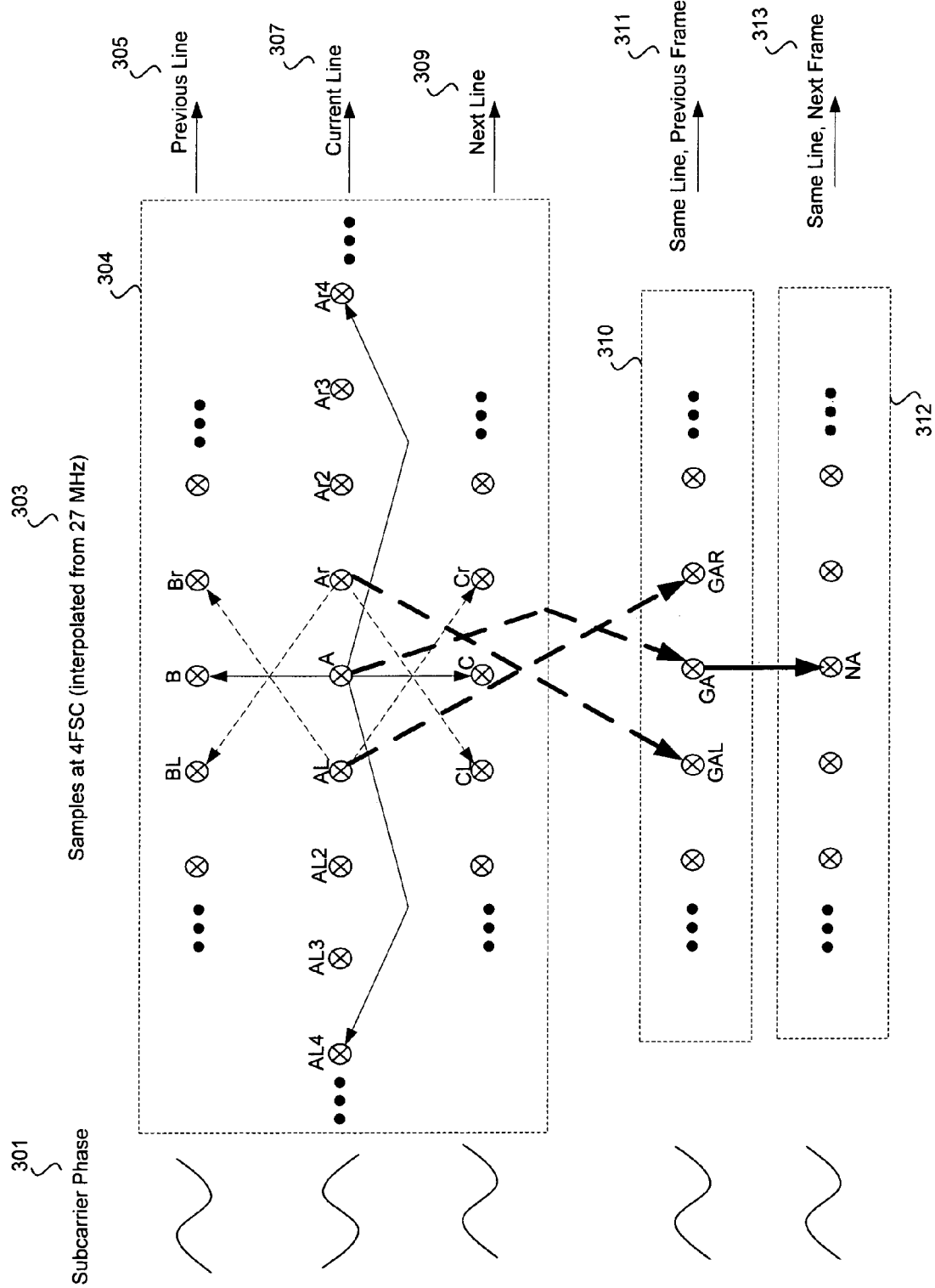
FIG. 3A is a diagram illustrating 2D and 3D bidirectional comb filtering, in accordance with an embodiment of the invention.

FIG. 3A is a diagram illustrating 2D and 3D bidirectional comb filtering, in accordance with an embodiment of the invention. Referring now to FIG. 3A, there is illustrated a sample of pixels from three adjacent lines in a current frame 304, a current line 307, a previous line 305, and a next line 309, as well as a same (current) line 311 in a previous frame 310 and a same (current) line 313 in a next frame 312. Pixels in the current line 307 may be one half cycle phase-shifted from corresponding pixels in the same line previous frame 311 and/or corresponding pixels in the same line next frame 313. In addition, pixels in the same line previous frame 311 may be in-phase with corresponding pixels in the same line next frame 312.

The subcarrier phase 301 of the incoming composite video signal may be 3.58 MHz, and the incoming analog video signal may be digitized at 27 MHz, for example. Since 3.58 MHz and 27 MHz are not multiples of each other, there may not be an exact pixel sample every 3.58 MHz of digitized video signal that is aligned and in-phase. For example, it may be difficult to compare the peak of a sine wave on the current line 307 with the peak of a sine wave on the next line 309, since a pixel sample may not be obtained at the 27 MHz frequency. The composite video signal, therefore, may be run through a filter that interpolates pixel samples 303 at four times the frequency of the sub-carrier. For example, if the subcarrier frequency is at 3.58 MHz, the pixel samples 303 may be interpolated at 14.32 MHz.

Pixels A, B and C may be true pixels. However, all the remaining pixels to the left and to the right of the true sample pixels A, B and C, such as pixels BL, Br, AL, AL2, AL3, AL4, Ar, Ar2, Ar3, Ar4, CL, and Cr, may be interpolated pixels. In a given line, each pixel may be shifted by a quarter subcarrier cycle from the adjacent pixel. In addition, each line may be 180 degree phase-shifted from its adjacent line. For example, true pixel A and interpolated pixel AL4, to the left of true pixel A in the current line 307, may be in phase with each other, whereas true pixel A and interpolated pixel AL may be quarter cycle phase-shifted from each other. Similarly, interpolated pixel Ar may be a quarter cycle phase-shifted to the right of pixel A, and interpolated pixel Ar4 may be in phase with true pixel A. Since the current line 307 may be 180 degrees phase-shifted from either the previous line 305 or the next line 309, true pixel A may also be phase-shifted 180 degrees from either true pixel B in the previous line 305 or true pixel C in the next line 309.

In an embodiment of the present invention, the amount of frequency content movement may be approximated between pixels within a given pixel line, between pixel lines within the same video frame, and between similar pixel lines in different frames, and the corresponding combing method may be applied with a minimum bandwidth loss. For example, if vertical combing is applied with regard to true pixel A, then true pixel A may be subtracted from true pixel B resulting in two times the luma, or true pixel A may be subtracted from true pixel C to obtain two times the luma, or true pixel A may be subtracted from the average of true pixels B and C to obtain two times the luma. The same process may be performed between true pixel A and interpolated pixel AL2, since they are out of phase. The phase difference between true pixels A and B is 180 degrees, which is the same as between true pixel A and interpolated pixel AL2. In order to determine whether vertical combing may be applied without a significant bandwidth loss, pixels in the current line 307 and the previous line 305 may be compared. For example, interpolated pixel AL in the current line 307 may be compared with interpolated pixel Br in the previous line 305, where interpolated pixel AL is in phase with interpolated pixel Br since there is 360-degree phase difference between them. Similarly, interpolated pixel Ar may be compared with interpolated pixel BL, where interpolated pixel Ar is in phase with interpolated pixel BL since there is 360 degrees phase difference between them as well.

If these two comparisons indicate a big difference, this may be indicative of significant vertical frequency content going from true pixel B to true pixel A. If the difference between the interpolated pixels in the two comparisons is small, then this may indicate that there is not a lot of vertical frequency content. Accordingly, vertical combing may be applied between the current line 307 and the previous line 305 without a significant bandwidth loss. Similarly, comparisons between the interpolated pixels AL and Cr, and Ar and CL may be indicative of whether vertical combing may be applied between the current line 307 and the next line 309, without a significant bandwidth loss. Depending on the composite video signal, there may be no frequency content between true pixel B and true pixel A, which indicates that the current line and the previous line are identical lines. A large frequency content between true pixel A and true pixel C may indicate that a vertical transition has happened immediately after the current line. Conversely, there may be a lot of frequency content between true pixel B and true pixel A, and no frequency content between true pixel A and true pixel C. This may be characterized by the fact that the current line and the next line are very similar, but the current line and the previous line are different. In this case, vertical combing may be performed between the current line and the next line.

A final comparison may be performed between true pixels A, B and C, in order to determine whether vertical combing may be applied with a minimum bandwidth loss. If true pixels A, B and C are, for example, all in phase with each other, this may be indicative that there is no chroma component and that true pixels A, B and C contain only luma components. For example, if true pixels A, B and C contain only luma components, the video signal may comprise a white character or a black background. In this case, since there is no frequency content between the current line 307, the previous line 305 and the next line 309, and vertical combing may be applied without a significant loss in bandwidth.

With regard to horizontal combing, or notch filtering, true pixel A may be compared with interpolated pixels AL4 and Ar4 in the current line 307, which are in phase with true pixel A. This may provide an indication of the horizontal frequency content in the current line 307. If true pixel A is very different from either of interpolated pixels AL4 or Ar4, it may indicate that there is significant frequency content in the current line 307. If, on the other hand, the pixels are very similar, it may indicate that there is less frequency content and horizontal combing may be applied. In an embodiment of the present invention, a wide band pass filter may be utilized in order to horizontally filter a composite signal and eliminate the luma component that is not near the chroma subcarrier frequency, for example, a 3.58 MHz subcarrier frequency.

In another aspect of the invention, bidirectional combing may be implemented by taking into consideration temporal signal comparisons between non-adjacent in-phase frames for purposes of applying temporal combing with a minimum temporal bandwidth loss. Referring again to FIG. 3A, pixels in the same line/previous frame 311 and same line/next frame 313 may be considered. For example, pixel GA may be a true pixel similar to true pixel A, but it may be phase-shifted 180 degrees from true pixel A in the previous frame 310. In addition, pixel NA may be a true pixel similar to true pixel A, but it may be phase-shifted 180 degrees from true pixel A in the next frame 312. Since true pixels GA and NA are phase-shifted at 360 degrees and are in phase with each other, they may be compared for temporal frequency content. More specifically, a coarse luma signal may be generated for both true pixel GA in the previous frame 310 and true pixel NA in the next frame 312. The difference between the coarse luma values for true pixels GA and NA may be indicative of the signal bandwidth between the previous frame 310 and the next frame 312 and whether the composite signal may be combed temporally and to what extent. The bandwidth measure between the true pixels GA and NA and the associated temporal combing quality may then be compared with the quality of 2D combing for the composite signal and whether horizontal and/or vertical combing may be applied within the current frame 304, and to what extent. Temporal combing as measured by the bidirectional combing process, as well as vertical and/or horizontal combing, may then be blended without a threshold and applied to the composite signal to obtain chroma and luma components.

In another aspect of the invention, bidirectional combing may be implemented by taking into consideration coarse chroma comparisons between the true pixel GA in the previous frame 311 and the true pixel NA in the next frame 312. The difference between the coarse chroma values for true pixels GA and NA may be indicative of the signal bandwidth between the previous frame 310 and the next frame 312 and whether the composite signal may be combed temporally and to what extent. The bandwidth measure between the true pixels GA and NA and the associated temporal combing quality may then be compared with the quality of 2D combing for the composite signal and whether horizontal and/or vertical combing may be applied within the current frame 304, and to what extent.

If either comparison of coarse chroma or coarse luma difference between true pixels GA and NA indicates a large difference, then it may be indicative of a significant temporal frequency content between the previous frame 311 the next frame 312, and temporal combing, therefore, may not be desirable since it may involve temporal bandwidth losses.

In yet another aspect of the invention, 3D combing may also be implemented taking into consideration temporal signal comparison between adjacent frames for purposes of applying temporal combing with a minimum temporal bandwidth loss. Accordingly, pixels in the same line/previous frame 311 may be considered. For example, true pixel GA may be an actual pixel similar to true pixel A, but it may be phase-shifted 180 degrees from pixel A in the previous frame. True pixel GA may be the same pixel as true pixel A in the previous frame 311, interpolated pixel GAL may be one quarter of a 3.58 MHz subcarrier frequency off to the left in the previous frame 311, and interpolated pixel GAR may be one-quarter of a subcarrier cycle off to the right on the same line in the previous frame 311. Since pixels Ar and GAL are phase-shifted at 360 degrees and are in phase with each other, they may be compared for temporal frequency content.

Similarly, pixels AL and GAR may also be compared for temporal frequency content. If these two comparisons indicate that the pixels are similar, then this may indicate that pixel A is very similar to pixel GA and that there is no temporal frequency content movement from the previous frame. In this case, temporal combing may be performed since there will be no significant temporal bandwidth loss. If, on the other hand, the two comparisons show a large difference, then it may be indicative of a significant temporal frequency content between the current and the previous frame, and temporal combing, therefore, may not be desirable since it may involve temporal bandwidth loss. A comparison between pixel A and pixel GA may be useful in instance where there is a pixel that bears no color, for example, a black and/or a white pixel. Such pixels are characterized only by a luma component and, therefore, have no phase difference between each other. In this case, temporal combing may be applied without any resulting temporal bandwidth loss.

A 3D bidirectional comb filter in accordance with an embodiment of the present invention may be implemented by first horizontally combing a composite video signal. The horizontal combing may be accomplished by running the composite video signal through a very wide band pass filter, for example, so that it may pre-filter the very low frequency luma component within the composite video signal. In this way, if there is very coarse (VC), slow moving luma changes, such VC luma may be eliminated and not be considered in subsequent vertical and/or temporal combing processes. If a subcarrier frequency of 3.58 MHz is utilized, chroma components may be centered around 3.58 MHz, or approximately between 2 and 5 MHz. In other words, any frequency content below 2 MHz may be considered a luma component and may be filtered out by the band pass filter. By performing the corresponding comparisons between pixels in the current frame 304, the previous frame 310 and/or the next frame 312, as outlined above, it may be determined whether vertical combing and/or temporal combing may be utilized without significant bandwidth loss. For example, horizontal and vertical combing, or 2D combing, may be the only useful combing methods in one embodiment of the present invention. In another embodiment of the present invention, horizontal, vertical and temporal combing, or 3D combing, may be applied without significant bandwidth loss. The temporal combing may be determined utilizing bidirectional combing between the previous frame 310 and the next frame 312. Temporal combing may also be determined by utilizing combing between the current frame 304 and the previous frame 311. A final combing decision as to a specific composite signal may include a blend of 2D and 3D combing. In this case, a certain percentage of a pixel may be only vertically or horizontally combed, and the remaining pixel may be combed vertically and temporally without utilizing any threshold values.

Figure 3B:
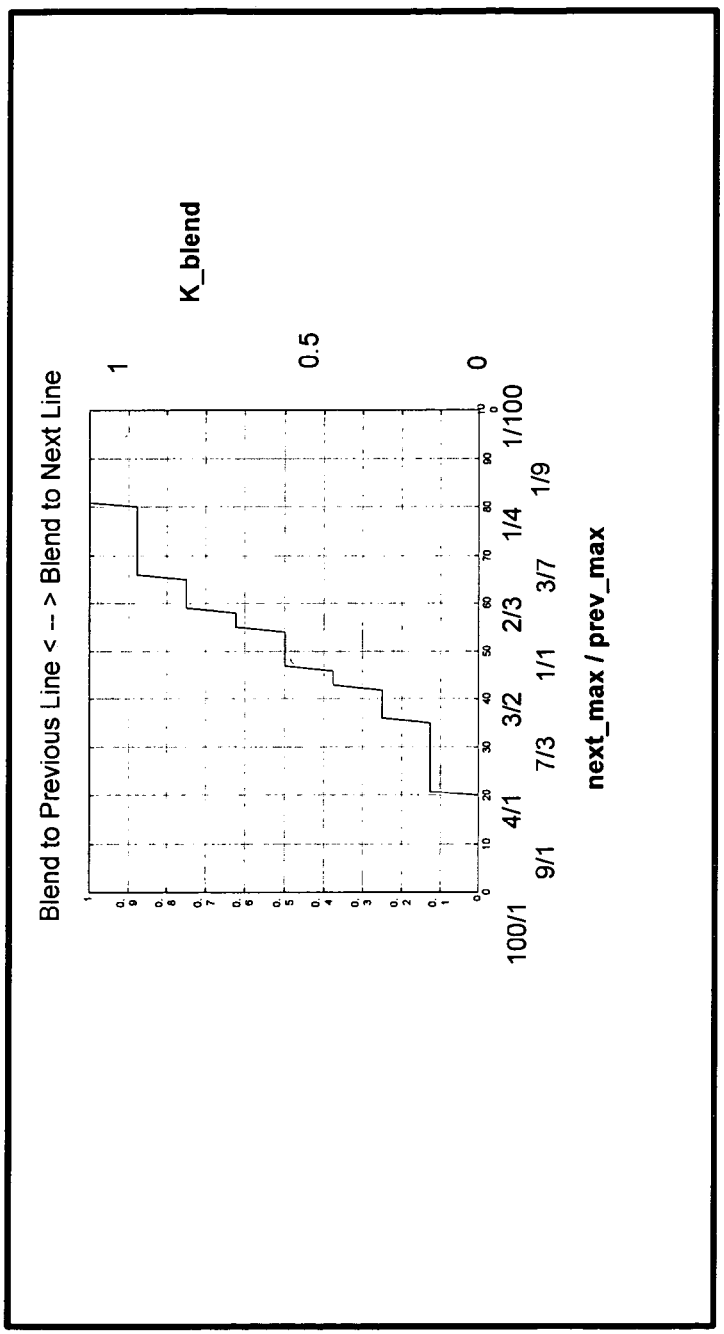
FIG. 3B is a diagram of a blending decision factor related to blending to a previous line versus blending to a next line, in accordance with an embodiment of the invention.

FIG. 3B is a diagram 330 of a blending decision factor related to blending to a previous line versus blending to a next line, in accordance with an embodiment of the invention. Referring now to FIG. 3B, a decision as to the quality of combing with the previous line versus combing with the next line may be accomplished by calculating a ratio k_blend of the previous line compares to the next line compares, for example. The k_blend ratio may be calculated using compares and constant multiplies so that it is a value between zero and one. This is a non-linear ratio between the comparison to the previous line and the comparison to the next line. A constant value in the k_blend calculation may be utilized to bias strongly against luma only comparisons. In the case of low chroma it may not be desirable to falsely pass the luma only condition. K_blend may be calculated as a function of next_max and prev_max. Next_max may be a measure of the bandwidth difference between a current line and a next line, for example. Prev_max may be a measure of the bandwidth difference between a current line and a previous line, for example. K_blend may be a function of the ratio of prev_max to next_max. The larger the ratio, the smaller the value of k_blend. The previous and next lines may be alpha blended together to comb with the current line. Conceptually the blend tends toward the smaller of prev and next. The blend may skew toward next_line when next_max/prev_max is small, and skew toward prev_line when prev_max/next_max is small.

In one aspect of the invention, a different blending decision factor may be determined. A notch filter may be utilized for horizontal combing. In order to obtain a better combing decision, a notch filter may be compared to a vertical comb filter by calculating a ratio of the quality of the vertical comb using the previous line, to the quality of the horizontal comb. A different ratio my be related to the quality of the vertical comb using the next line, to the quality of the horizontal comb.

Figure 3C:
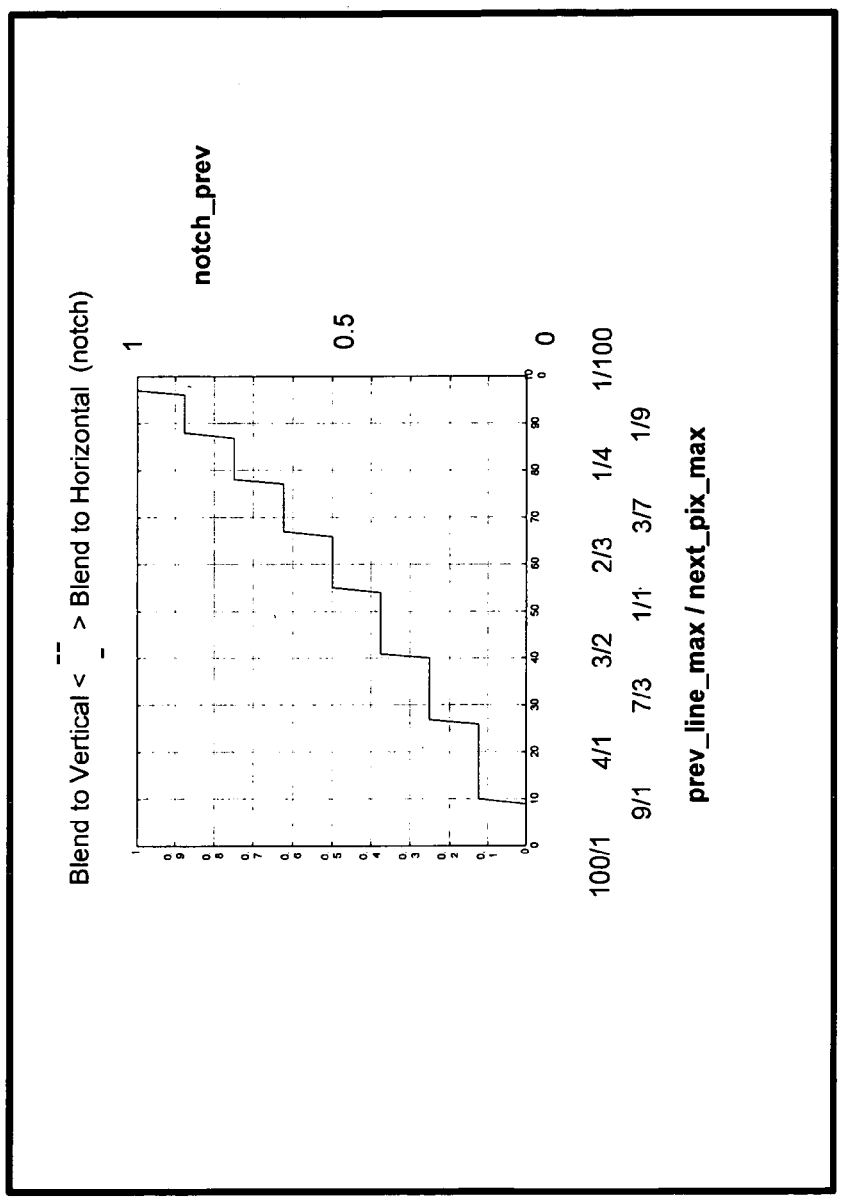
FIG. 3C is a diagram of a blending decision factor related to blending vertically versus blending horizontally, in accordance with an embodiment of the invention.

FIG. 3C is a diagram 340 of a blending decision factor related to blending vertically versus blending horizontally, in accordance with an embodiment of the invention. Referring now to FIG. 3C, a blending decision factor may be determined from a ratio notch_prev, where notch_prev may indicate whether to blend vertically and/or horizontally between a current line and a previous line. Notch_prev may be determined as a function of prev_line_max and next_pix_max. Prev_line_max may be a measure of the bandwidth difference between a current line and a previous line. Next_pix_max may be a measure of the bandwidth difference between two sets of in-phase pixels in a current line. A higher notch_prev ratio may indicate a preference towards notching versus vertical blending.

A notch_next ratio may be determined in a similar way, where notch_next may indicate whether to blend vertically and/or horizontally between a current line and a next line. A final notch ratio may be determined as a function of the notch_prev and notch_next ratios in order to obtain a blending decision factor related to blending vertically versus blending horizontally. For example, a final notch value for each pixel may be determined by the following equation:

notch=notch_next.*$k$_blend+notch_prev.*(1−$k$_blend);

Conceptually, if the k_blend combing decision tends towards combing with the top line, the top line may be given more weight in judging the relative goodness of notching. If the k_blend combing decision tends towards combing with the bottom line, the bottom line may be given more weight in judging the relative goodness of notching.

In cases of significantly more luma than chroma at a given point in a composite signal, a notch filter may be gradually disabled. This is because the notch filter tends to put most of the signal that is left, after an initial high pass filter, into chroma. If the combed signal is mostly luma, it may be inefficient to allow it to be put into chroma.

Figure 3D:
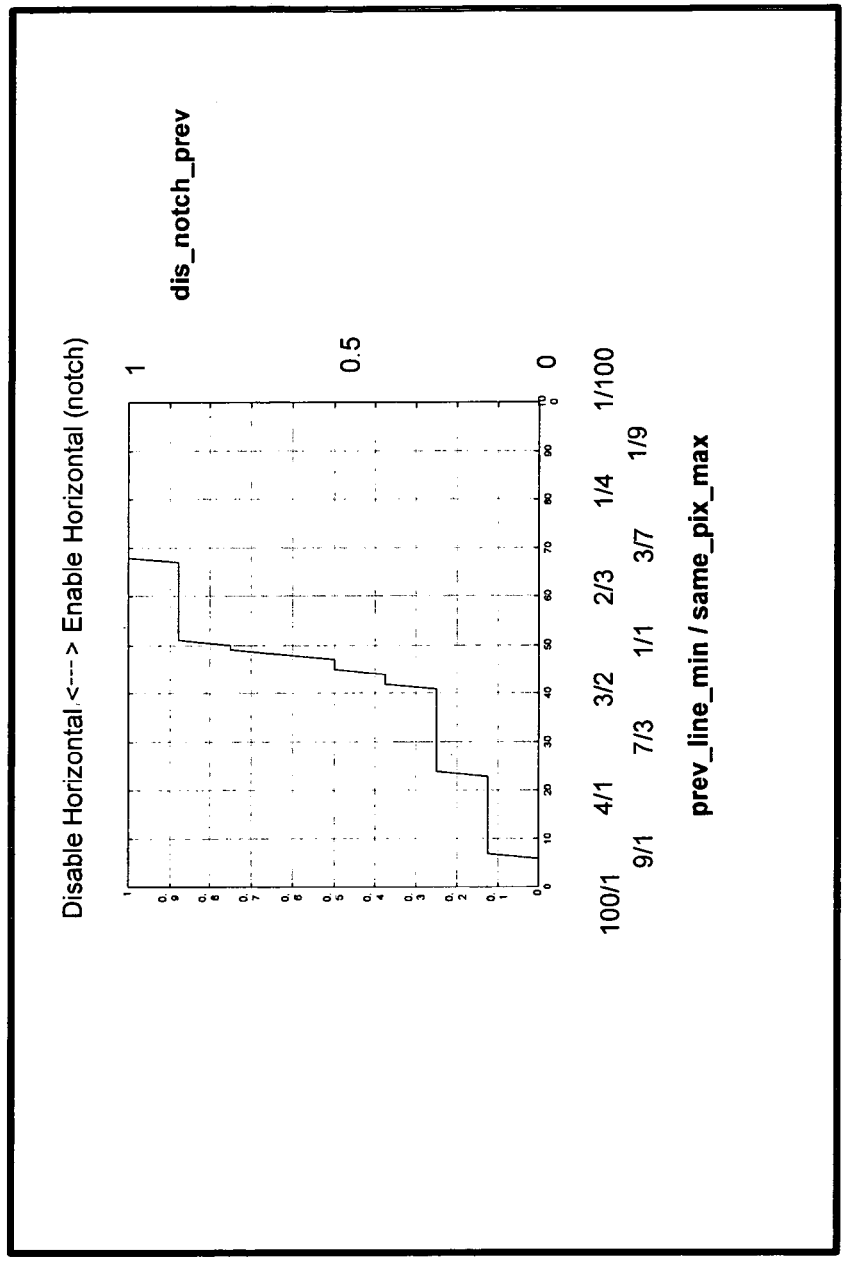
FIG. 3D is a diagram of a blending decision factor related to enabling horizontal combing versus disabling horizontal combing, in accordance with an embodiment of the invention.

FIG. 3D is a diagram 350 of a blending decision factor related to enabling horizontal combing versus disabling horizontal combing, in accordance with an embodiment of the invention. Referring now to FIG. 3D, a disable notch signal dis_notch_prev may be generated by a ratio of the previous/next line compare with the previous/next line luma only compare. If the point is mostly luma, the luma only compare will be much smaller than the in phase compare. Dis_notch_prev may be determined as a ratio between prev_line_min and same_pix_max, for example. Prev_line_min may be associated with a bandwidth difference between in-phase pixels in a current and previous lines. Same_pix max may be associated with a bandwidth difference between out-of-phase pixels in a current, previous and next line.

Similarly, a dis_notch_next may be determined as a ratio between next_line_min and same pix_max, for example, where next_line_min may be associated with a bandwidth difference between in-phase pixels in a current and next lines. Dis_notch_next and dis_notch_prev, therefore, may be determined by the ratio of the previous or next line luma and chroma compare to the previous or next line luma only compare.

If the amplitude of the band passed video signal is very small relative to the difference to the closest matching adjacent line, then the disable notch parameter is not an accurate measure. In this case, the disable notch may not be used. A disable vertical notch, dis_vert_notch, parameter may be utilized.

Figure 3E:
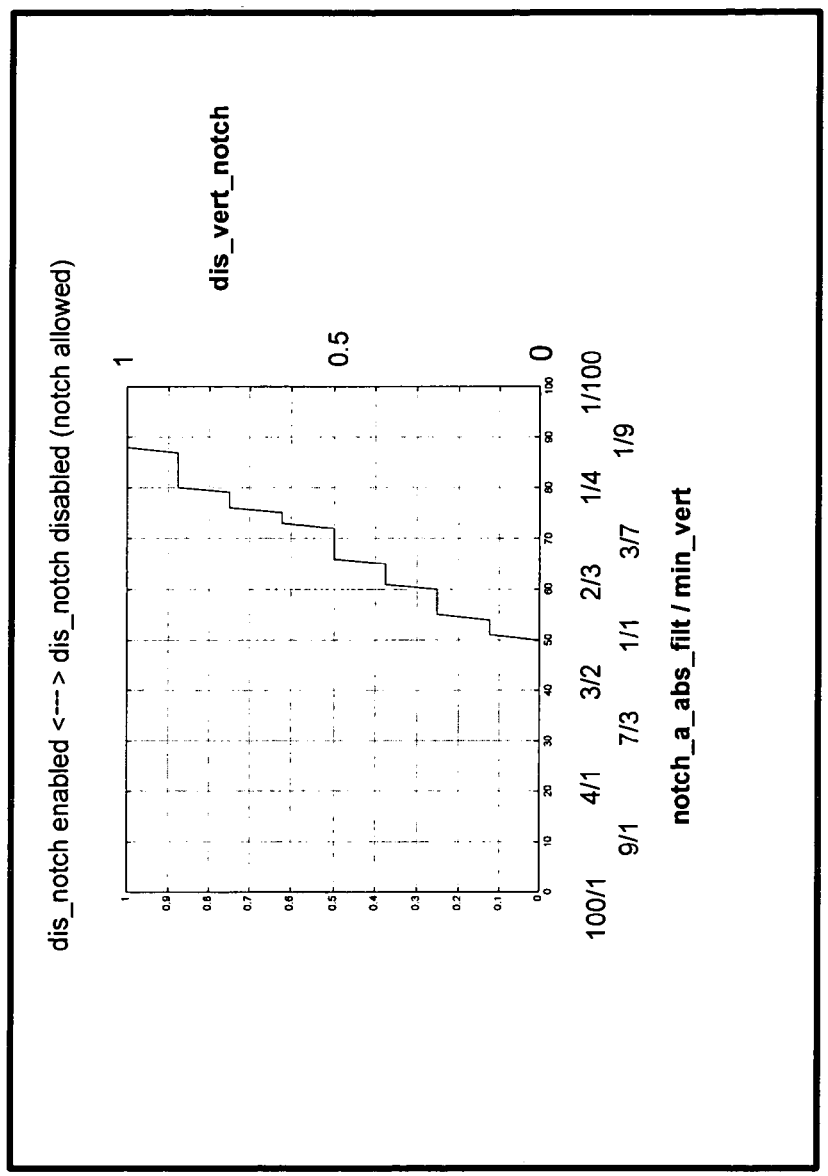
FIG. 3E is a diagram of a blending decision factor related to horizontal combing, in accordance with an embodiment of the invention.

FIG. 3E is a diagram 360 of a blending decision factor related to horizontal combing, in accordance with an embodiment of the invention. Referring now to FIG. 3E, a dis_vert_notch may be calculated as a ratio of notch_a_abs_filt and min_vert, for example. Notch_a_abs_filt may measure the absolute value of an amplitude of a signal on a current line. Min_vert may be associated with the minimum of bandwidth difference between current line and a previous line, and/or a current line and a next line.

Conceptually, if dis_vert_notch is 0, then it has no effect. Dis_notch is allowed to mask or not mask notch. If dis_vert_notch is 1, then dis_notch has no effect and dis_notch may be disabled. In this case notch is never masked, and the decision to notch or vertically comb is utilized without modification. A weighted disable notch ratio dis_notch may be calculated as:

$$dis\_notch = \max(dis\_notch, dis\_vert\_notch)$$

The calculated notch signal may be cubed and disable notch may be squared. This may cause the roll off due to notch to be accelerated. Then disable notch may be used to calculate a final value for notching. Notch may also be low pass filtered and may be generated according to the following equation:

$$notch = dis\_notch^2 * notch^3$$

Referring again to FIG. 3A, since true pixels A and GA are 180 degrees out of phase with each other, in chroma, they may not be directly compared, except in the case where there is no chroma at this point. Points A, B, C and G are true pixels sampled at 27 MHz. All the other pixels may be interpolated to give 4FSC sample points. Pixels AL and AR may be one quarter of a subcarrier cycle away from true pixel A. Pixels GAL and GAR may be one quarter of a subcarrier cycle away from pixel GA. Since pixels A and GA may be 180 degrees out of phase with each other, AL may be in phase with GAR and AR may be in phase with GAL. Since they are in phase they can be directly compared. There may be some spatial difference between these pixels and pixels A and GA. But, by shifting the samples a quarter of a cycle in each direction, the spatial difference may be minimized a measure of the temporal bandwidth (motion). In order to calculate a measure of temporal bandwidth, in the case where there is no chroma at this point, true pixel G may be compared directly with true pixel A. The actual measure of the temporal bandwidth may be calculated by comparing the temporal bandwidth in the case with chroma and the case of luma only. The results may be low pass filtered.

An estimate may be obtained of the quality of the 2D comb. This may be calculated based on the difference between the current pixel and the pixel that the 2D combing logic decided to comb with. First the vertical difference may be calculated according to the ratio of k_blend. Next this may be blended with the horizontal quality according to the ratio of notch. The qualities of the vertical blends, previous and next, may be weighted together to give an overall vertical quality measure. This vertical quality measure may then be weighted together with the horizontal quality, giving an overall quality measure of the 2D comb.

Figure 4A:
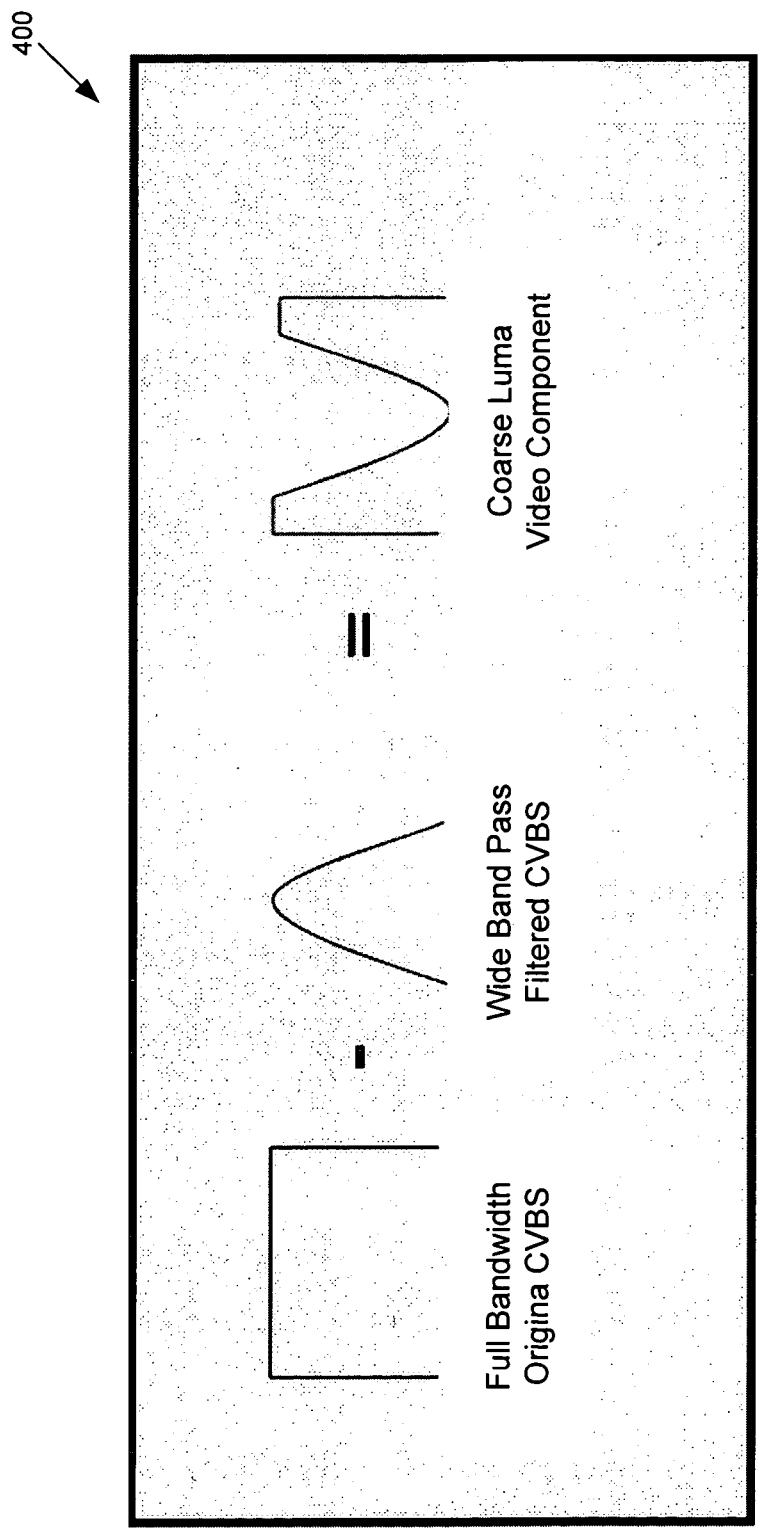
FIG. 4A is a diagram of coarse luma determination, in accordance with an embodiment of the invention.

FIG. 4A is a diagram 400 of coarse luma determination, in accordance with an embodiment of the invention. A coarse estimate of luma may be obtained for both the current frame and the previous frame as illustrated in FIG. 4A. This may be accomplished by subtracting the band passed signal from the composite signal. In this way, the part of luma that is clearly outside the chroma bandwidth range may be obtained. The coarse estimate of luma may be used to mask off the 3D combing decision. If the luma part of the composite signal does not match between the two frames, it may be determined that there is motion. This may be true even if the band passed part of the signal matches perfectly.

Figure 4B:
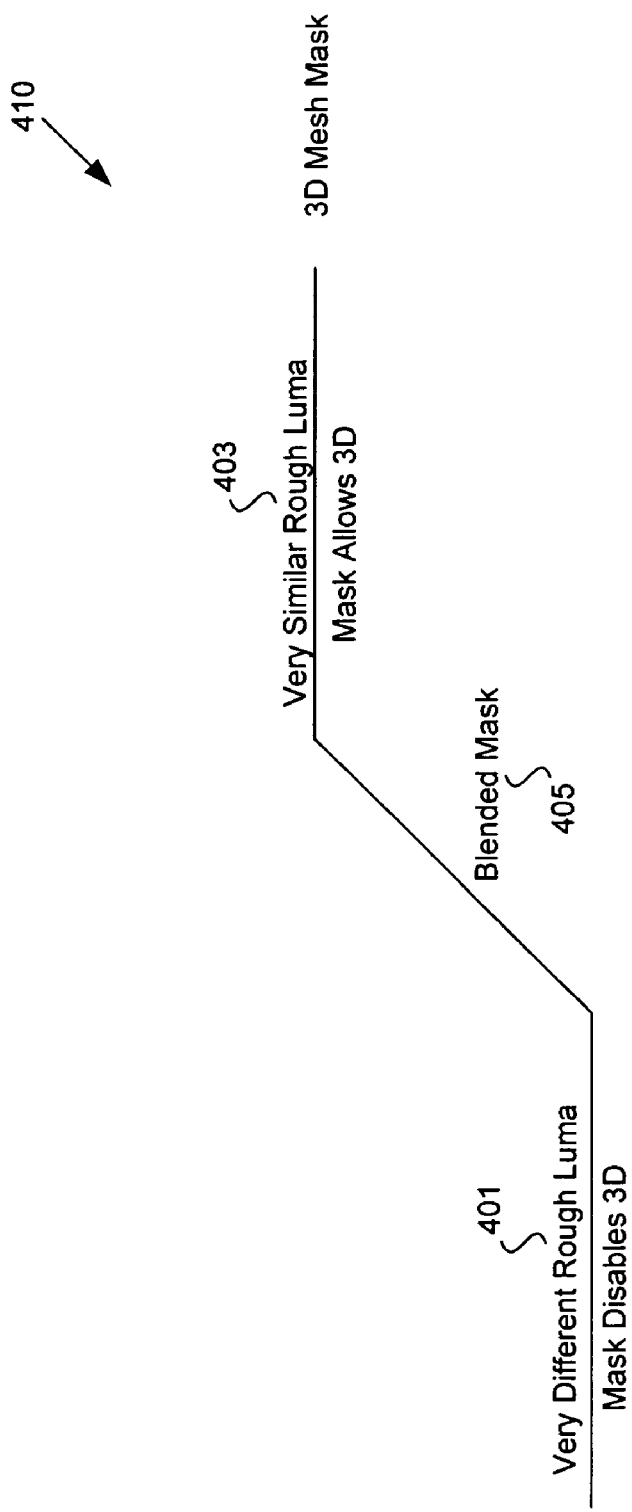
FIG. 4B is a diagram of a 3D comb filter mesh mask, in accordance with an embodiment of the invention.

FIG. 4B is a diagram 410 of a 3D comb filter mesh mask, in accordance with an embodiment of the present invention. A mesh mask may be utilized in order to ascertain whether 3D combing may be utilized for a specific composite signal. In a composite video signal, a wide band pass filter may be utilized to filter very high and low chroma and luma components. The output of the wide band pass filter may be subtracted from the original composite signal input, and the low frequency luma component may be obtained, or a rough estimate of the low frequency luma. Such estimate of low frequency luma may be calculated for a current frame and for a previous frame, for example. The two resulting rough values of luma may then be compared on a pixel-by-pixel basis. If the two rough luma values are very different, then 3D combing may be disabled by the mask, at 401, and 2D combing may be the only method that may be applied to separate luma and chroma components in the composite video signal. If the two rough luma values are very similar, then 3D combing may be allowed by the mesh mask, at 403, and the composite video signal may be combed horizontally, vertically and temporally. For any value of the luma difference, which is between 401 and 403, a blended mask 405 may be applied to separate the luma and chroma components of the composite video signal.

In another aspect of the invention, bidirectional combing may be applied and estimates of low frequency luma may be calculated for a previous frame and a next frame, for example. The two resulting rough values of luma may then be compared on a pixel-by-pixel basis. The same 3D mesh mask as illustrated on FIG. 4B may be utilized in the case where bidirectional combing is used to determine applicability of temporal, or 3D, combing. If the two rough luma values are very different, then 3D combing may be disabled by the mask, at 401, and 2D combing may be the only method that may be applied to separate luma and chroma components in the composite video signal. If the two rough luma values are very similar, then 3D combing may be allowed by the mesh mask, at 403, and the composite video signal may be combed horizontally, vertically and temporally. For any value of the luma difference, which is between 401 and 403, a blended mask 405 may be applied to separate the luma and chroma components of the composite video signal.

In yet another aspect of the invention, the blended mask 405 may be applied in cases where the two rough luma values are not very different. A blended mask may indicate, for example, that a certain percentage of the 3D combing, for example 30%, may be "trusted" and the remaining percent, for example the remaining 70%, may be combed via 2D combing. The blended mask may re-adjust the ratio between 3D combing and 2D combing for a given pixel depending on how close the two rough luma values are to being very different and how close they are to being very similar.

Figure 4C:
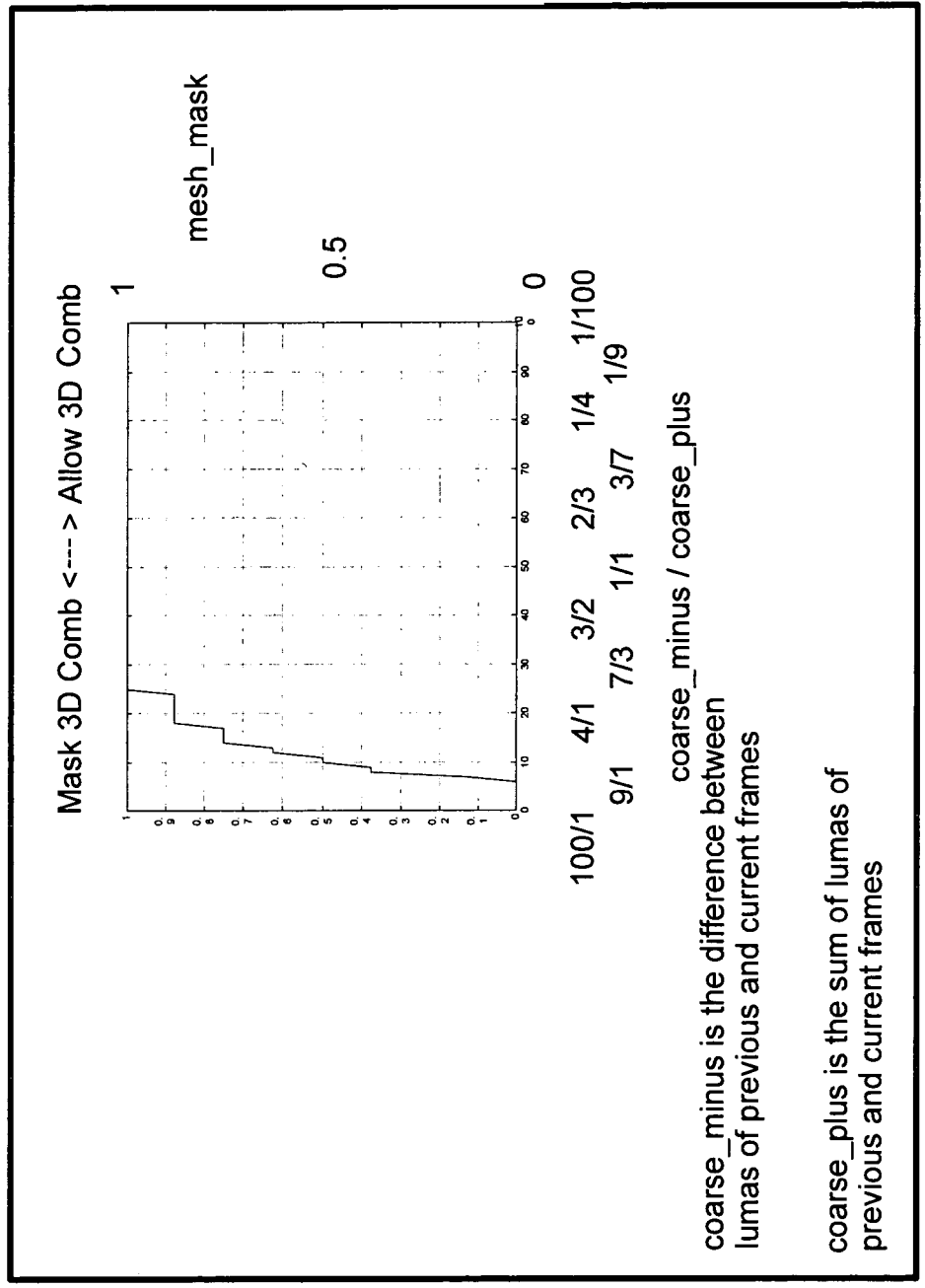
FIG. 4C is another diagram of a 3D comb filter mesh mask, in accordance with an embodiment of the invention.

FIG. 4C is another diagram 420 of a 3D comb filter mesh mask, in accordance with an embodiment of the invention. Mesh_mask may be determined as a ratio between coarse_minus and coarse_plus, for example. Coarse_minus may be the difference between lumas of previous and current frames. Coarse_plus may be the sum of lumas of previous and current frames. Mesh_mask ratio may tend towards masking 3D combing if the luma between the two consecutive frames is very different. It may also tend towards allowing 3D combing if the luma between the two consecutive frames is very similar.

Figure 4D:
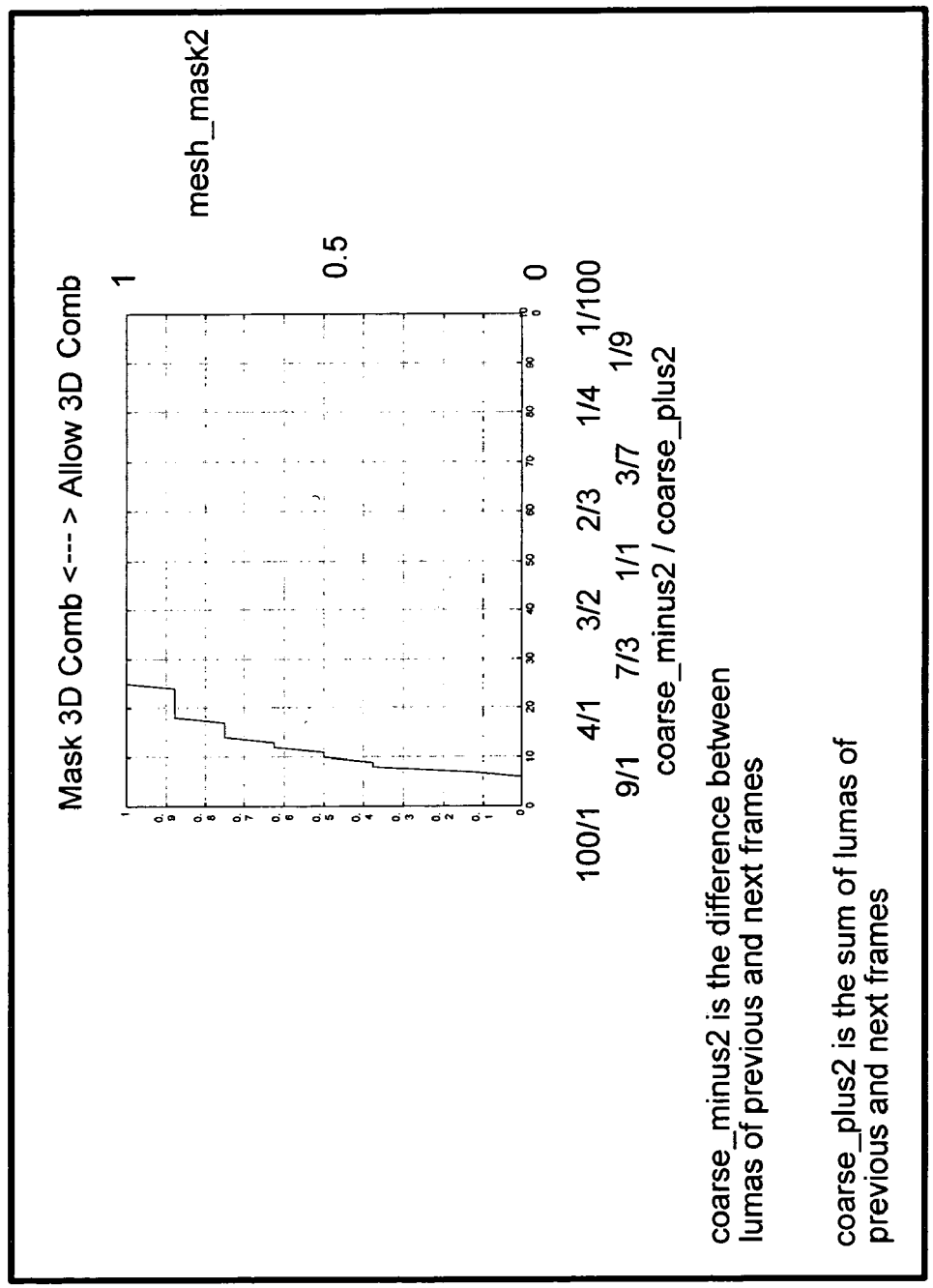
FIG. 4D is a diagram of a 3D comb filter mesh mask for bidirectional comb, in accordance with an embodiment of the invention.

FIG. 4D is a diagram 430 of a 3D comb filter mesh mask for bidirectional comb, in accordance with an embodiment of the invention. Mesh_mask2 may be determined as a ratio between coarse_minus2 and coarse_plus2, for example. Coarse_minus2 may be the difference between luma-s of previous and next frames, as may be determined according to bidirectional combing methods described above. Coarse_plus2 may be the sum of lumas of previous and next frames. Mesh_mask2 ratio may tend towards masking 3D bidirectional combing if the luma between the previous and next frames is very different. It may also tend towards allowing 3D bidirectional combing if the luma between the two consecutive frames is very similar.

Figure 4E:
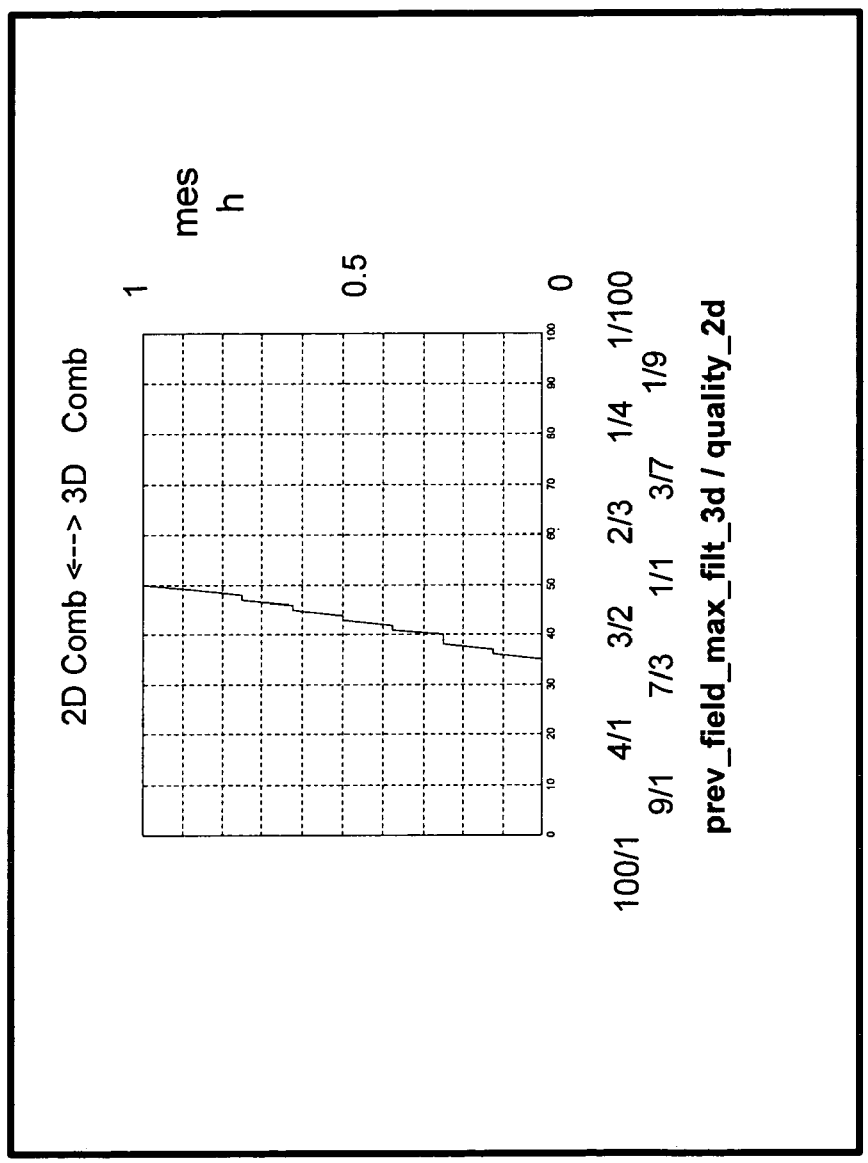
FIG. 4E is a diagram of a 3D comb filter mesh, in accordance with an embodiment of the invention.

FIG. 4E is another diagram 440 of a 3D comb filter mesh, in accordance with an embodiment of the invention. Referring now to FIG. 4E, a mesh ratio may be determined as a measure of combing quality of 2D combing versus 3D combing. Mesh ratio may be determined as a ratio between prev field_max_filt_3d and quality_2d. Prev_field_max_filt_3d may be a measure of bandwidth difference between a pixel in a current frame and the same pixel in a previous frame. Quality_2d may be a measure of quality of 2D combing, as measured, for example, by various ratios as specified above in this application.

To determine the blending of 3D combing versus 2D combing the quality of the 2D comb decision is compared with the quality of 3D combing. The ratio of these two numbers determines the blend between 2D and 3D combing. Conceptually, mesh may tend towards the smaller of quality_2d (error term of 2D comb) and prev_field_max_filt_3d (error term of 3D comb). The larger prev_field_max_filt_3d is (or the worse the quality of the 3D comb), the more mesh may tend to 2D comb. The larger quality_2d (or the worse the quality of the 2D comb), the more mesh may tend to 3D comb.

A final blend of 3D combing and 2D combing may be based on the product of the mesh and the mesh mask. The following equation may be utilized:

mesh=mesh*mesh_mask

The final mesh value may be used to alpha blend the chroma and luma between 2D and 3D combing.

Figure 5:
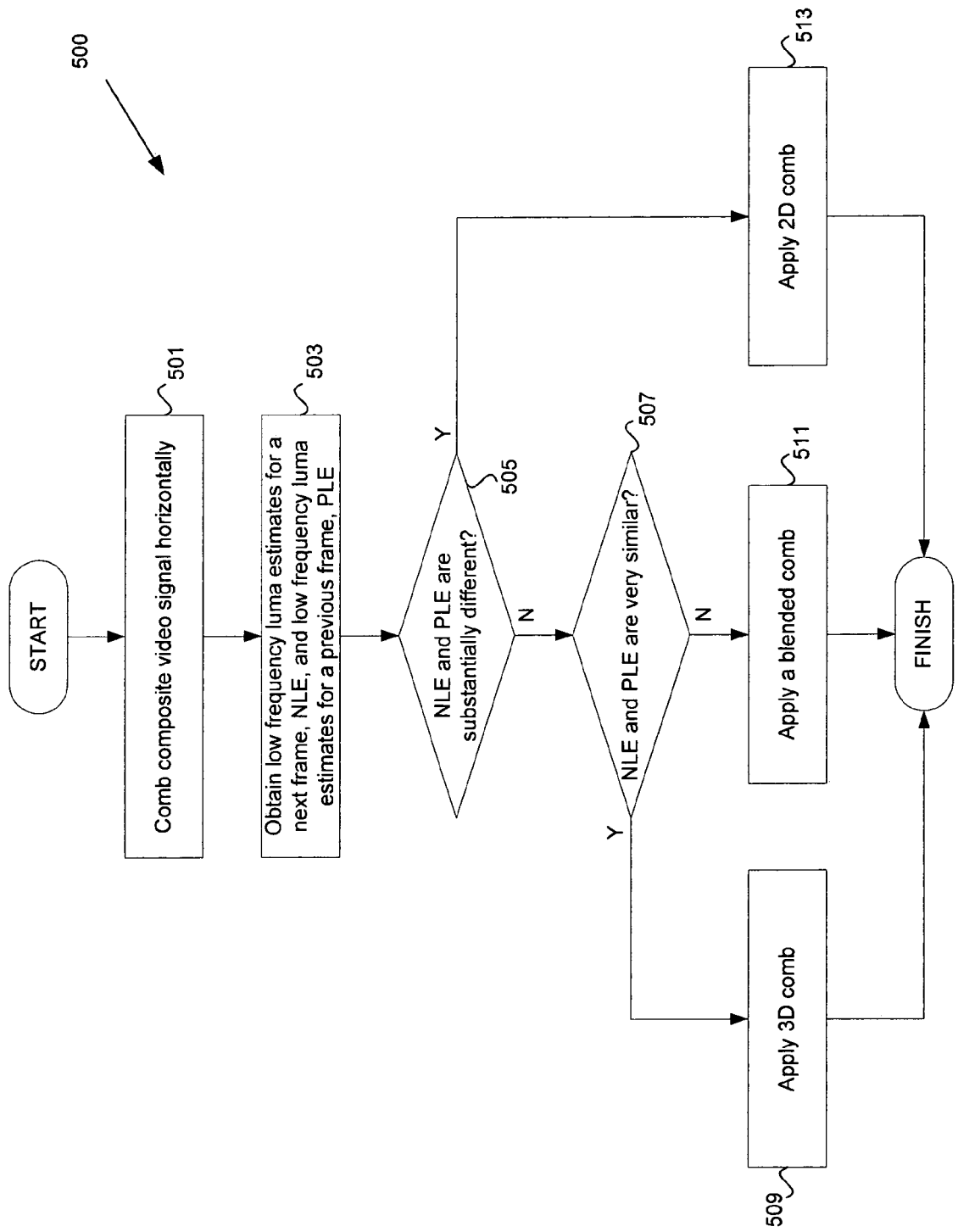
FIG. 5 is a flow diagram of a method for bidirectional comb filtering of a composite video signal, in accordance with an embodiment of the invention.

FIG. 5 is a flow diagram of an exemplary method 500 for bidirectional comb filtering of a composite video signal, in accordance with an embodiment of the invention. At 501, a composite video signal may be combed horizontally. For example, a composite video signal may be notch filtered by utilizing a wide band pass filter. At 503, estimates of a low frequency luma component for a next frame, NLE, and a low frequency luma component for a previous frame, PLE, may be obtained. For example, in order to estimate NLE and PLE, the output of the wide band pass filter may be subtracted from the original composite video signal. At 505, it may be determined whether NLE and PLE are substantially different. If NLE and PLE are substantially different, at 513, 3D bidirectional combing may be disabled and only 2D combing may be utilized with the original composite video signal. If the NLE and PLE are not substantially different, at 507, it may be determined whether NLE and PLE are very similar. If NLE and PLE are very similar, at 509, 3D bidirectional combing may be applied to the original composite video signal. If NLE and PLE are not very similar, a blended comb approach may be taken, at 511. In this way, a certain percentage of vertical and bidirectional temporal combing may be utilized with the original composite video signal.

Figure 6:
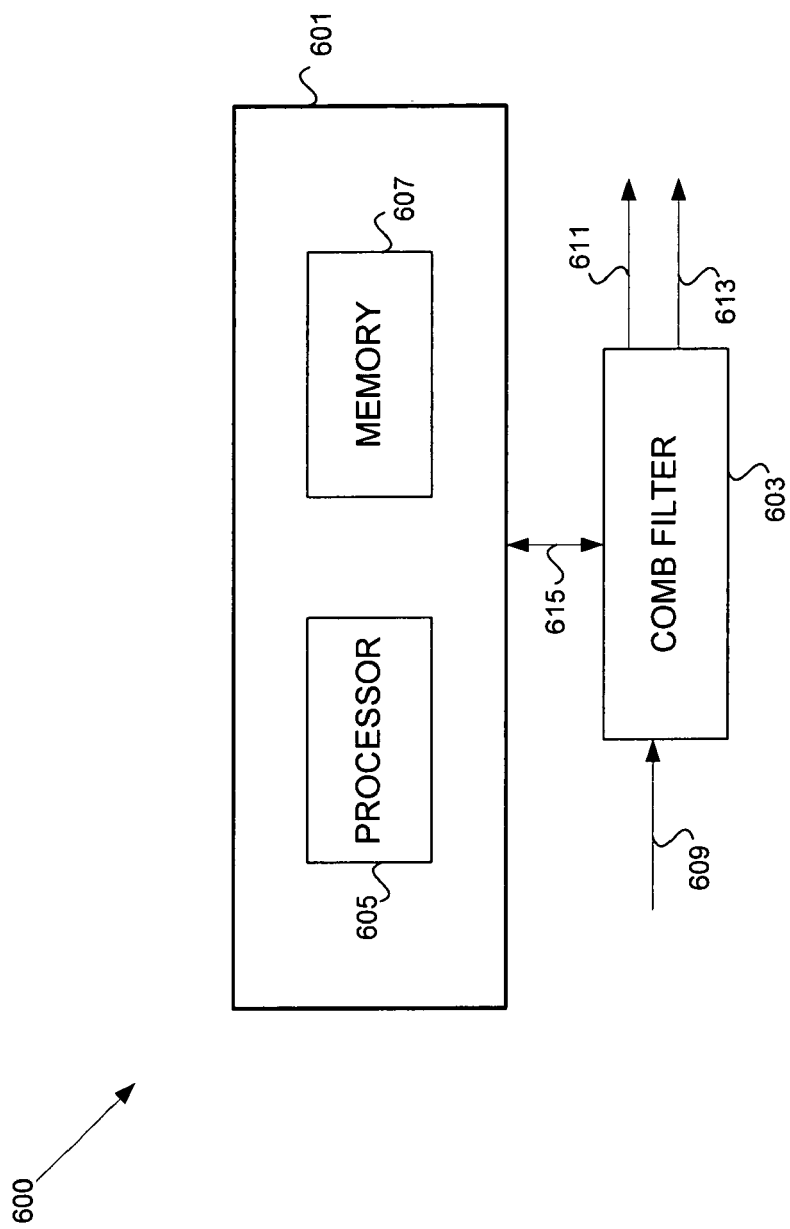
FIG. 6 is a block diagram of an exemplary system that may be used in connection with bidirectional combing of a composite video signal, in accordance with an embodiment of the invention.

FIG. 6 is a block diagram of an exemplary system that may be used in connection with bidirectional combing of a composite video signal, in accordance with an embodiment of the invention. Referring now to FIG. 6, the system 600 may comprise a host 601 and a comb filter 603. The host 601 may comprise a processor 605 and a host memory 607. The host 601 may be communicatively coupled to the comb filter 603 via an interface bus 615. In another embodiment of the present invention, the comb filter 603 may be a part of the host 601.

In operation, the comb filter 603, which may comprise suitable logic, circuitry and/or code, may be adapted to receive a video signal 609, separate the chroma and luma components, and then output the chroma component 611 and the luma component 613 separately. The processor 605 may generate a plurality of interpolated pixels in a previous frame, which corresponds to the interpolated pixels in the current frame. The processor 605 may generate a plurality of interpolated pixels in a next frame, which corresponds to the interpolated pixels in the current frame. The processor 605 may determine at least one direction of least bandwidth among at least a portion of all the generated interpolated pixels and true pixels in the current frame, and may blend combing according to the determined at least one direction of least bandwidth.

The interpolated pixels generated by the processor 605 for the current frame may be one half cycle phase-shifted from the interpolated pixels in the previous frame and or in the next frame. The interpolated pixels generated by the processor 605 for the previous frame may be in-phase with the interpolated pixels in the next frame. The processor 605 may generate the plurality of interpolated pixels for the current line, so that each of the plurality of interpolated pixels in the current line is one quarter cycle phase-shifted from a corresponding adjacent pixel in the current line. The processor 605 may be adapted to comb horizontally, if the determined direction of least bandwidth is among in-phase interpolated pixels in the current line. The processor 605 may comb vertically, if the determined direction of least bandwidth is among corresponding in-phase interpolated pixels in the current line and at least one of the previous line and the next line.

The processor 605 may comb vertically, if the determined direction of least bandwidth is among corresponding one-half cycle phase-shifted true pixels in the current line and at least one of the previous line and the next line for a luma-only video signal. If the determined direction of least bandwidth is among corresponding in-phase interpolated pixels in the previous frame and in the next frame, the processor 605 may comb temporally. If the determined direction of least bandwidth is among corresponding in-phase true pixels in the previous frame and in the next frame, the processor 605 may comb temporally. The processor 605 may comb in a horizontal direction and a vertical direction for the current video frame, and may blend the combing in the horizontal direction and the vertical direction and combing in a temporal direction for the current video frame.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for separating luma and chroma components in a composite video signal, the method comprising:
   generating a plurality of interpolated pixels for a current line, a next line and a previous line in a current frame;
   generating a plurality of interpolated pixels in a previous frame, which corresponds to the interpolated pixels in the current frame;
   generating a plurality of interpolated pixels in a next frame, which corresponds to the interpolated pixels in the current frame;
   determining at least one direction of least bandwidth among at least a portion of all the generated interpolated pixels and true pixels in the current frame; and
   blending combing according to the determined at least one direction of least bandwidth.

2. The method of claim 1, wherein the interpolated pixels for the current frame are one half cycle phase-shifted from the interpolated pixels in the previous frame.

3. The method of claim 1, wherein the interpolated pixels for the current frame are one half cycle phase-shifted from the interpolated pixels in the next frame.

4. The method of claim 1, wherein the interpolated pixels for the previous frame are in-phase with the interpolated pixels in the next frame.

5. The method of claim 1, comprising generating the plurality of interpolated pixels for the current line, so that each of the plurality of interpolated pixels in the current line is one quarter cycle phase-shifted from a corresponding adjacent pixel in the current line.

6. The method of claim 5, comprising combing horizontally, if the determined direction of least bandwidth is among in-phase interpolated pixels in the current line.

7. The method of claim 1, comprising combing vertically, if the determined direction of least bandwidth is among corresponding in-phase interpolated pixels in the current line and at least one of the previous line and the next line.

8. The method of claim 1, comprising combing vertically, if the determined direction of least bandwidth is among corresponding one-half cycle phase-shifted true pixels in the current line and at least one of the previous line and the next line for a luma-only video signal.

9. The method of claim 1, comprising combing temporally, if the determined direction of least bandwidth is among corresponding in-phase interpolated pixels in the previous frame and in the next frame.

10. The method of claim 1, comprising combing temporally, if the determined direction of least bandwidth is among corresponding in-phase true pixels in the previous frame and in the next frame.

11. The method of claim 1, comprising combing in a horizontal direction and a vertical direction for the current video frame.

12. The method of claim 11, comprising blending the combing in the horizontal direction and the vertical direction and combing in a temporal direction for the current video frame.

13. A machine-readable storage having stored thereon, a computer program having at least one code section for separating luma and chroma components in a composite video signal, the at least one code section being executable by a machine for causing the machine to perform steps comprising:
   generating a plurality of interpolated pixels for a current line, a next line and a previous line in a current frame;
   generating a plurality of interpolated pixels in a previous frame, which corresponds to the interpolated pixels in the current frame;
   generating a plurality of interpolated pixels in a next frame, which corresponds to the interpolated pixels in the current frame;
   determining at least one direction of least bandwidth among at least a portion of all the generated interpolated pixels and true pixels in the current frame; and
   blending combing according to the determined at least one direction of least bandwidth.

14. The machine-readable storage of claim 13, wherein the interpolated pixels for the current frame are one half cycle phase-shifted from the interpolated pixels in the previous frame.

15. The machine-readable storage of claim 13, wherein the interpolated pixels for the current frame are one half cycle phase-shifted from the interpolated pixels in the next frame.

16. The machine-readable storage of claim 13, wherein the interpolated pixels for the previous frame are in-phase with the interpolated pixels in the next frame.

17. The machine-readable storage of claim 13, comprising code for generating the plurality of interpolated pixels for the current line, so that each of the plurality of interpolated pixels in the current line is one quarter cycle phase-shifted from a corresponding adjacent pixel in the current line.

18. The machine-readable storage of claim 17, comprising code for combing horizontally, if the determined direction of least bandwidth is among in-phase interpolated pixels in the current line.

19. The machine-readable storage of claim 13, comprising code for combing vertically, if the determined direction of least bandwidth is among corresponding in-phase interpolated pixels in the current line and at least one of the previous line and the next line.

20. The machine-readable storage of claim 13, comprising code for combing vertically, if the determined direction of least bandwidth is among corresponding one-half cycle phase-shifted true pixels in the current line and at least one of the previous line and the next line for a luma-only video signal.

21. The machine-readable storage of claim 13, comprising code for combing temporally, if the determined direction of least bandwidth is among corresponding in-phase interpolated pixels in the previous frame and in the next frame.

22. The machine-readable storage of claim 13, comprising code for combing temporally, if the determined direction of least bandwidth is among corresponding in-phase true pixels in the previous frame and in the next frame.

23. The machine-readable storage of claim 13, comprising code for combing in a horizontal direction and a vertical direction for the current video frame.

24. The machine-readable storage of claim 23, comprising code for blending the combing in the horizontal direction and the vertical direction and combing in a temporal direction for the current video frame.

25. A system for separating luma and chroma components in a composite video signal, the system comprising:

at least one processor that generates a plurality of interpolated pixels for a current line, a next line and a previous line in a current frame;

the at least one processor generates a plurality of interpolated pixels in a previous frame, which corresponds to the interpolated pixels in the current frame;

the at least one processor generates a plurality of interpolated pixels in a next frame, which corresponds to the interpolated pixels in the current frame;

the at least one processor determines at least one direction of least bandwidth among at least a portion of all the generated interpolated pixels and true pixels in the current frame; and the at least one processor blends combing according to the determined at least one direction of least bandwidth.

26. The system of claim 25, wherein the interpolated pixels for the current frame are one half cycle phase-shifted from the interpolated pixels in the previous frame.

27. The system of claim 25, wherein the interpolated pixels for the current frame are one half cycle phase-shifted from the interpolated pixels in the next frame.

28. The system of claim 25, wherein the interpolated pixels for the previous frame are in-phase with the interpolated pixels in the next frame.

29. The system of claim 25, wherein the at least one processor generates the plurality of interpolated pixels for the current line, so that each of the plurality of interpolated pixels in the current line is one quarter cycle phase-shifted from a corresponding adjacent pixel in the current line.

30. The system of claim 29, wherein the at least one processor combs horizontally, if the determined direction of least bandwidth is among in-phase interpolated pixels in the current line.

31. The system of claim 25, wherein the at least one processor combs vertically, if the determined direction of least bandwidth is among corresponding in-phase interpolated pixels in the current line and at least one of the previous line and the next line.

32. The system of claim 25, wherein the at least one processor combs vertically, if the determined direction of least bandwidth is among corresponding one-half cycle phase-shifted true pixels in the current line and at least one of the previous line and the next line for a luma-only video signal.

33. The system of claim 25, wherein the at least one processor combs temporally, if the determined direction of least bandwidth is among corresponding in-phase interpolated pixels in the previous frame and in the next frame.

34. The system of claim 25, wherein the at least one processor combs temporally, if the determined direction of least bandwidth is among corresponding in-phase true pixels in the previous frame and in the next frame.

35. The system of claim 25, wherein the at least one processor combs in a horizontal direction and a vertical direction for the current video frame.

36. The system of claim 35, wherein the at least one processor blends the combing in the horizontal direction and the vertical direction and combing in a temporal direction for the current video frame.

* * * * *